US012614461B2

(12) United States Patent
Puphal

(10) Patent No.: US 12,614,461 B2
(45) Date of Patent: Apr. 28, 2026

(54) METHOD, PROGRAM, STORAGE MEDIUM AND ASSISTANCE SYSTEM FOR ASSISTING AN OPERATOR OF AN EGO-AGENT

(71) Applicant: Honda Motor Co., Ltd., Tokyo (JP)

(72) Inventor: Tim Puphal, Offenbach (DE)

(73) Assignee: Honda Motor Co., Ltd., Tokyo (JP)

( * ) Notice: Subject to any disclaimer, the term of this patent is extended or adjusted under 35 U.S.C. 154(b) by 328 days.

(21) Appl. No.: 18/476,240

(22) Filed: Sep. 27, 2023

(65) Prior Publication Data

US 2025/0104561 A1 Mar. 27, 2025

(51) Int. Cl.
*G08G 1/16* (2006.01)

(52) U.S. Cl.
CPC .................................... *G08G 1/166* (2013.01)

(58) Field of Classification Search
CPC ....................................................... G08G 1/166
USPC .......................................................... 701/117
See application file for complete search history.

(56) References Cited

U.S. PATENT DOCUMENTS 8,989,914 B1 3/2015 Nemat-Nasser et al.
9,463,797 B2 10/2016 Damerow et al.
9,623,878 B2 4/2017 Tan et al.
10,627,812 B2 4/2020 Eggert et al.
10,836,390 B2 11/2020 Tahmasbi-Sarvestani
11,216,888 B2 1/2022 Perl et al.
11,430,071 B2 * 8/2022 Shalev-Shwartz ........................... G01C 21/3407
11,518,342 B2 12/2022 Chen et al.
2005/0110348 A1 5/2005 Hijikata et al.
2008/0195281 A1 8/2008 Norris et al.
2016/0283686 A1 9/2016 Hu et al.
2019/0295179 A1 * 9/2019 Shalev-Shwartz ........................... B60W 30/18163
2019/0391580 A1 * 12/2019 Di Cairano ............ G08G 1/165
2020/0017124 A1 * 1/2020 Camhi .............. B60W 60/0053
2020/0231149 A1 7/2020 Eggert et al.
2022/0253021 A1 8/2022 Campos et al.
2022/0266842 A1 8/2022 Li et al.
2023/0377462 A1 * 11/2023 Ellis .................... G06F 18/2431
2025/0220383 A1 * 7/2025 Satloff .................. G10L 19/008

FOREIGN PATENT DOCUMENTS

EP 4068153 10/2022
WO 2020010822 1/2020

* cited by examiner

*Primary Examiner* — Yazan A Soofi
(74) *Attorney, Agent, or Firm* — JCIPRNET

(57) ABSTRACT

A method and system for assisting an operator of an ego-agent by communicating a risk in a future situation to the operator. A behavior planning algorithm is applied using a first value and a second value of the parameter in a cost function of the behavior planning algorithm to determine a first and second planned behavior. A current state of the ego-agent is determined to determine an actual behavior. Based on a relation of the first and second planned behavior and an actual behavior of the ego-agent, a personalized parameter value is estimated. A parameter correction value is determined based on the personalized parameter value and a target parameter value. The personalized parameter value is corrected using the parameter correction value to generate an adapted parameter value. The behavior planning algorithm is applied based on the adapted parameter value and estimating the risk, which is then communicated to the operator.

17 Claims, 4 Drawing Sheets

| | | |
|---|---|---|
| Brake for low risk → $\alpha$ high | High speed for overtaking → $\beta$ high | Wait to not change behavior often → $\gamma$ high |

METHOD, PROGRAM, STORAGE MEDIUM AND ASSISTANCE SYSTEM FOR ASSISTING AN OPERATOR OF AN EGO-AGENT

BACKGROUND

Technical Field

The present disclosure relates to the field of assisting an operator of an ego-agent. In particular, a method for assisting the operator of an ego-agent, a corresponding program comprising program code, a corresponding non-transitory computer readable storage medium, and an assistance system for assisting the operator of an ego-agent are proposed.

Related Art

When people operate ego-agents in an environment where also other agents are present, there is generally a risk of a collision between the agents. The density of traffic significantly increased over the last years, and it is quite challenging for the operators of the agents to observe all the other agents in the environment in order to react in due time on their behavior such that collisions can be avoided. Further, there are other risks that are encountered in operating a vehicle, for example curve risks or regulatory risks. The performance of modern processors and availability of sensors like radar sensors, cameras, LIDAR sensors or the like providing the processor with information on the environment of the ego-agent enables assistance for operators of ego-agents in their operation of the ego-agent. However, the style of operating an ego-agent significantly varies from operator to operator. Thus, in many situations, the assistance system proposes behaviors or even interfere (e.g., in a case of semi-automated driving) with the control operation by the operator in a way that is distracting the operator.

There are some approaches that tried to adapt the systems to individual operator's behaviors so that the operator is not bothered and therefore acceptance of the assistance made by the system is increased. U.S. Pat. No. 9,623,878 B2, for example, proposes a driver assistance system, which is personalized and learns from the driver's habits. However, the proposed system adjusts a control parameter, for example, a target distance of an ACC (adaptive cruise control) to the driver's particular driving style. Unfortunately, such approach leads to an assistance system that reflects the individual driving styles but has no effect on the behavior of the driver.

Quite a number of different approaches have been developed for generating control signals for autonomous driving or partially autonomous driving. One approach is described in U.S. Pat. No. 9,463,797 B2 in which a future trajectory for an ego-agent is predicted and from such prediction a plurality of trajectory alternatives for the ego-agent are generated. Further, a hypothetical future trajectory for another agent is determined and based on at least one pair of trajectories of the ego-agent and of the other agent risk functions over time or along the calculated hypothetical trajectory of the ego-agent alternatives are calculated. These risk functions are then combined in a risk map which is then analyzed to generate the control signal.

U.S. Pat. No. 10,627,812 B2 relates to another problem of known assistance systems. For making a correct prediction, it is necessary that information on the environment used in the prediction algorithm is correct. However, since most of the information is obtained using one or more sensors, certain areas in the environment relevant for correctly assessing the traffic situation may be occluded. U.S. Pat. No. 10,627,812 B2 mitigates the risk of such blind spots by assuming a virtual traffic entity in the area for which the confidence for the sensor data is below a certain threshold or no sensor data is available at all, and lets the virtual traffic entity interact with a predicted behavior of the ego-agent. A respective risk measure is estimated and the estimated risk measure is taken into consideration for a controlling action of the ego-agent.

US 2020/0231149 A1 supports a driver of an ego-agent by considering priority relationships between the ego-agent and at least one other traffic participant and selecting a respective prediction model for the traffic participant. The selection of the prediction model therefore takes into consideration the determined priority relationship between the involved agents and therefore improves the assistance by a more precise prediction of the future behavior of the other agent.

EP 4 068 153 A1 describes an advanced driver assistance system in which, based on information received from sensors, a feature of the environment is determined and the risk zone of the feature is estimated. The feature and the risk zone of the feature are then displayed on a displayed together with the environment of the vehicle in a map.

As the above provided examples of known assistance systems clearly show, there are several different approaches in order to estimate the risk and provide an operator of an agent with information on that risk or to adapt control of an agent to the habits of its operator. However, there is still the problem that the style of one operator of an agent in the traffic situation may significantly differ from another agent's style. This may lead to misinterpretations of a specific situation, which is not only difficult for a human operator but also for automated systems. Thus, there is still a need to find a way of harmonizing the styles of operation of the plurality of agents' operators involved in a traffic situation. Such a harmonization could significantly increase the quality of prediction and their confidences and would, thus, directly improve traffic safety.

SUMMARY

With the present invention this problem is solved by adapting the estimation of a future risk based on habits of the individual operator but, contrary to what is known from the prior art, not by only by trying to meet the operator's expectations, but further considering a difference between the style of the operator and a target style. This is achieved by an adaptation in the estimation of future risks so that the communicated output finally educates the operator (driver) towards the target style. This target style is e.g., an average driving style and if operating in line with the target style could be reached for any operator of an agent, the dangerous differences in driving style between different agents could be reduced.

According to the invention, this is achieved by a method, corresponding program, computer-readable storage medium and assistance system for assisting an operator by communicating an estimated risk to the operator with the estimation of the risk being adapted to influence operation of the ego-agent starting from an analysis of the operator's driving habits. First, a behavior planning algorithm using a first value of the parameter and a second value of the parameter in a cost function of a behavior planning algorithm is executed to determine a first and a second planned behavior. Further, the current state of the ego-agent is determined in order to derive the actual behavior of the ego-agent operated by its operator. A personalized parameter value reflecting this actual behavior is then estimated based on the relation of the first and the second planned behavior, and the actual behavior of the ego-agent. Using such a personalized parameter value in the behavior planning algorithm would result in a planned behavior corresponding to the habits of the operator of the ego-agent. Since this does not lead to any change in the operator's habits but only models the operator's style in the cost function used for behavior planning, the invention proposes to correct the personalized parameter value using a parameter correction value. Determining the parameter correction value is at least based on the estimated personalized parameter value and a target parameter value. For example, knowing the target parameter value and the personalized parameter value estimated for the individual operator allows to shift the personalized parameter value towards the target parameter value thereby generating an adapted parameter value by correcting the personalized parameter value using the parameter correction value.

More than two parameter values can be used as well to determine more than two planned behaviors. An improved estimation of the personalized parameter value can be accordingly done using these more than two planned behaviors, for example by better interpolation.

This adapted parameter value is then applied in the behavior planning algorithm and a risk is estimated. This risk is finally communicated to the operator. So the risk communicated to the operator corresponds more to the risk that would be communicated to an operator with an average style. Since the estimation and communication of the risk no longer precisely reflects the style of the operator, this causes a training effect of the assisted operator finally harmonizing the styles of all assisted operators.

BRIEF DESCRIPTION OF THE DRAWINGS

The description of embodiments refers to the enclosed figures.

DETAILED DESCRIPTION

Figure 1:
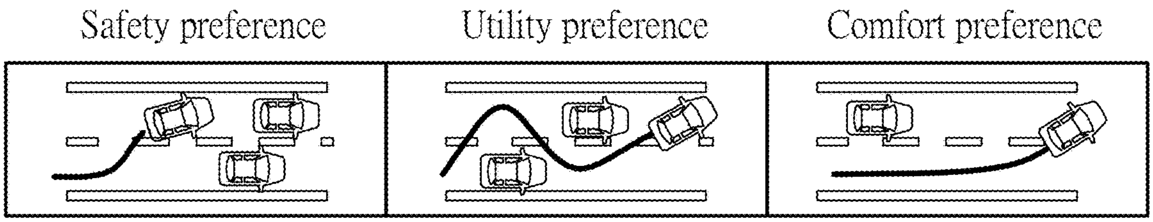
FIG. 1 illustrates different components of a cost function used for behavior planning.

According to an embodiment, the personalized parameter value is estimated using interpolating the actual behavior with the first and second planned behavior. Using interpolation for estimating the personalized parameter value has the advantage that the estimation can be made online, which means during operation of the ego-agent. As a consequence, even when the style of the operator changes, the guidance will be kept effective.

Further, the personalized parameter value can be estimated using a comparison of the acceleration of the actual behavior and the acceleration according to the first and second planned behavior. Acceleration can easily be sensed for the ego-agent and no or almost no preprocessing of the sensor values is necessary. This reduces the computational costs and improves the real time application, for example, in a vehicle.

According to an embodiment of the invention, the parameter correction value is calculated based on a difference between the target parameter value and the personalized parameter value, and a correction coefficient. This has the advantage that on the one hand it is directly considered how much the actual behavior differs from the target behavior, resulting in a greater correction in case that a greater difference is recognized. On the other hand, the correction value allows a further adjustment how strong the correction is. It is in particular possible to determine the value of the correction coefficient based at least on one of: amount of the difference between the personalized parameter value and the target parameter value, and an operator condition. So starting from the difference between the actual behavior and the target behavior, and a constant correction coefficient, even more aspects can be taken into consideration.

According to another advantageous embodiment, the estimation of the personalized parameter value is repeatedly executed during operation of the ego-agent. Repeatedly estimating the personalized parameter value allows to adjust the correction to the actual behavior which may change during operation of the ego-agent.

On the other hand, it might be preferred to estimate the personalized parameter value based on a plurality of actual parameter values estimated based on the relation of the first and second planned behavior and an actual behavior of the ego-agent. Taking into consideration a plurality of actual parameter values avoids that for every change of an estimated actual parameter value the personalized parameter value follows this change. For example, a moving average could be calculated from a certain number of actual parameter values or hysteresis could be applied, filtering small changes in the estimated actual parameter values. The personalized parameter value is then updated only if a significant change in the style of the operator is recognized.

According to another preferred embodiment, the last personalized parameter value estimated during a previous operation of the ego-agent is used as the personalized parameter value for the risk estimation of a current operation. If the starting point is the personalized parameter value estimated during previous operation of the ego-agent, it is specifically preferred to update the last personalized parameter value estimated during a previous operation of the ego-vehicle with the personalized parameter value estimated during the current operation of the ego-vehicle and the updated personalized parameter is then used as the personalized parameter value for the risk estimation of the current operation. In order to enable such use of a previously estimated personalized parameter value, the system comprises a non-volatile memory in which the latest personalized parameter value is stored.

Actual parameter values can be estimated repeatedly based on the relation of the first and second planned behavior, and an actual behavior of the ego-agent, and a confidence measure can be calculated for the latest actual parameter value. This last actual parameter value is taken over as the personalized parameter value when its confidence measure exceeds a confidence threshold. The confidence threshold, for example, quantifies the frequency of changes of the personalized parameter value.

The parameter value lies in an interval and, for determining a first and a second planned behavior, a lower limit of the interval is used as the first value of the parameter and the upper limit of the interval is used as the second value of the parameter. So if the extreme values defined by the limits of the interval are used in order to determine the first and the second planned behavior, it is easily possible to use an interpolation for estimating personalized parameter value with a high accuracy. The interpolation may use a step function, linear function, two concatenated linear functions or sigmoid function for estimating the actual parameter values.

It is to be noted that the personalized parameter value and an actual parameter value can be used interchangeably for embodiments in which no processing of the actual parameter values is made to derive the personalized parameters. The estimation of the personalized parameter values is the same as the estimation of the actual parameter value. However, for explanation of embodiments that process the actual parameter to determine the personalized parameter, it will be distinguished between “personalized” and “actual”.

The cost function preferably comprises, in addition to a risk component, at least one of: a utility component and a comfort component, each component being weighted with a dedicated parameter. Having such a cost function comprising a plurality of different components allows to guide the operator of ego-agent towards the desired behavior not only with respect to aspects of risk but also to other aspects like utility or comfort. In such a case, the method is executed in respect of the risk component, and, in addition, in respect of at least one of the utility component and the comfort component.

Further, the development of the correction value over time can be evaluated and a feedback on the evaluation result is provided to the operator. The correction values are then stored on a non-volatile memory and after a predetermined time interval or upon request (for example from the operator), an evaluation of the course of the correction values over time is made.

It is to be noted that the present invention can be applied for all kinds of vehicles including planes, boats, micro mobility robots but even pedestrians. In most cases, the operator of the ego-agent will be the driver of a ego-vehicle, pilot of a plane and so on. However, the operator may even control the ego-agent from a remote position.

Before all the estimation and determination steps are explained in more detail, the general background of the present invention and the effect of educating the operator shall be explained.

The individual style of an operator with which the operator operates the ego-agent can be modelled using coefficients weighting the individual components in a cost function that is used in behavior planning. The cost function can be described as:

$$cost=\alpha*risk-\beta*utility+\gamma*comfort$$

The parameters α, β and γ adjust the overall cost function and can have values from an interval from a lower limit to an upper limit. It is to be noted that the interval does not need to be the same for all the parameters. The influence of the values a parameter can have been illustrated in FIG. 1. On the left side the first component of the cost function is illustrated describing the safety preference.

On the left side of FIG. 1, the safety preference is illustrated. For the first parameter α having a high value, the resulting cost function will lead to a planned behavior with braking already for low risks. So, the first parameter α takes account of the risk, which is accepted in the planned behavior. In the same way, the second parameter β defines utility preference, which means, for example, that a respectively planned behavior allows high-speed overtaking in case that the value for the second parameter β is set high. Finally, as illustrated in the right part of FIG. 1, the third parameter γ relates to the comfort preference and will result in a planned behavior that rather waits to not change an actual behavior often, when the third parameter γ is set to a high value.

The cost function and the resulting planned behavior when a behavior planning algorithm is executed using the cost function with given parameters allow on the other hand to model an operating style of an operator. So, while originally the values for the three parameters define in which way a behavior in a certain situation is planned, it is also possible to determine from an observed actual behavior of the ego-agent the corresponding parameter values, which describe the habits and style of an operator. The first parameter α for example describes how close and operator (ego-agent) approaches other agents or how long he/she is staying close to other agents. The second parameter β describes how fast an operator wants to reach the destination or how often he/she changes lanes. Finally, the third parameter γ describes how often the operator is accelerating or decelerating and how strong the acceleration or deceleration is.

Figure 2:
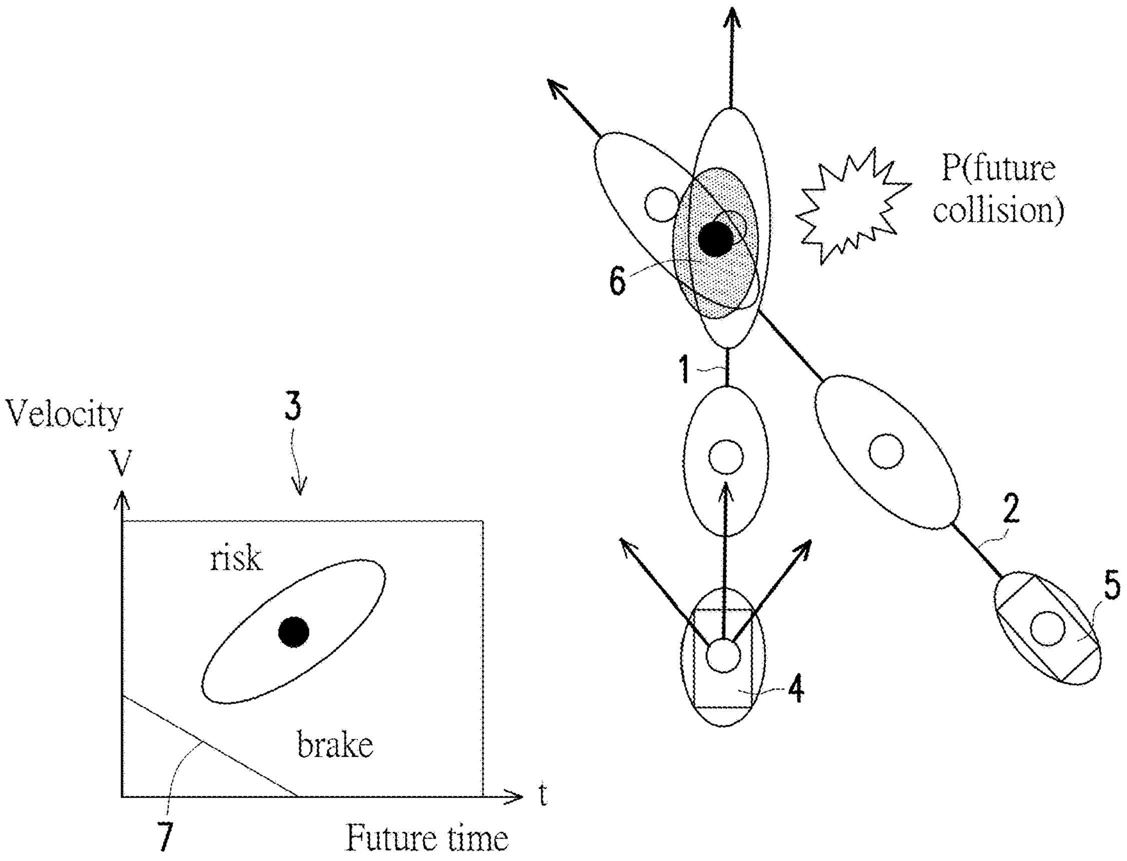
FIG. 2: illustrates the meaning of risk maps.

FIG. 2 illustrates the principle how risk maps are used for behavior planning. Based on predicted trajectories 1, 2 of an ego-agent and another agent, and taking into consideration Gaussian and Poisson distributions for uncertainties in space and time, which may result from sensor uncertainties, for example, a risk map 3 can be created in which the velocity v is presented over time. The right side of FIG. 2 shows intersecting trajectories 1, 2 for the ego-agent 4 and another agent 5 and the respective distributions of the positions of the ego-agent 4 and the other agent 5 over time, which means along the trajectories 1, 2. These distributions of the positions of the agents 4, 5 over time allows to determine an area 6 of a predicted collision between the agents. This predicted collision is included in the risk map 3 shown on the left side of FIG. 2, in which in addition to the risk, a way around the risk for the ego-agent 4 is included. In the illustration, the collision can be avoided by performing a deceleration of the ego-agent 7.

It is to be noted that apart from behavior planning, risk maps may also be used in order to create warnings and communicate the identified risks to the operator of the ego-agent. Such communication of risks or outputting of warnings and also behavior planning with risk maps is known in the art.

The trajectories are calculated in a known manner using information on vehicle states that are obtained from sensors mounted or carried by the agent. This information can be enhanced with agent-to-agent information. The obtained information is processed by a processor which performs the computational steps for the planning as explained above, but, with respect to the present invention also the estimation, correction and all other computations described below.

For the following explanations, the aspect “risk” will be mainly used for the explanations. However, these explanations are similarly valid for estimating a personalized parameter value β, γ for the components “utility” and/or “comfort”.

Based on risk maps that are used in a behavior planner as explained above, a personalized parameter value can be estimated from the cost function as given below.

As explained previously, the values of the three parameters result in different planned behaviors. The first parameter α is particularly relevant with respect to a risk of a collision when another agent is involved. It may be understood as a measure for the size of the risk zone, as illustrated in the upper part of FIG. 3. The smaller the value of the first parameter α, the smaller is the size of the risk zone, and vice versa.

Figure 3:
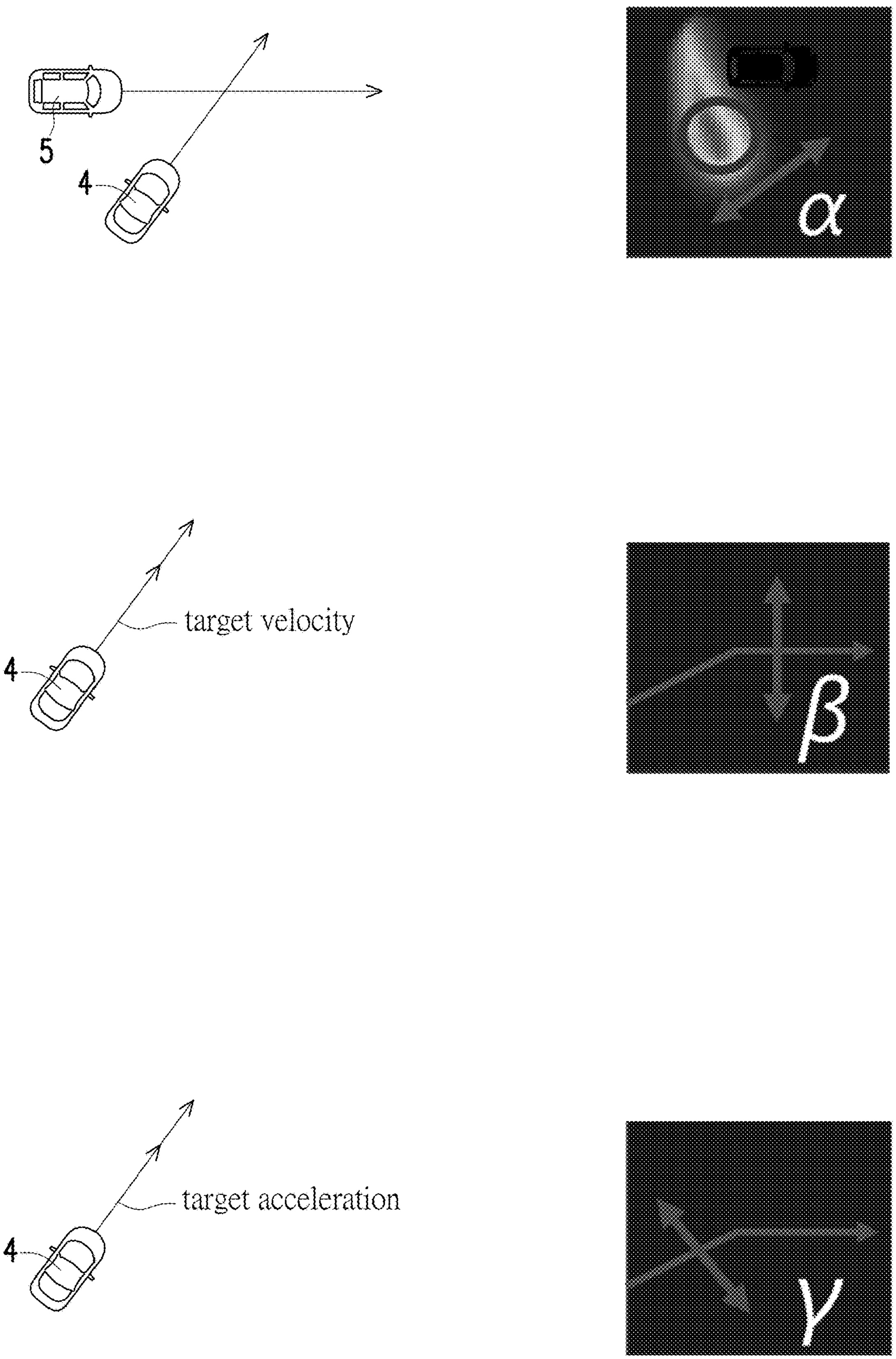
FIG. 3: illustrates relation between behavior planning based on risk maps and parameter values in a cost function.

In the middle of FIG. 3, the influence of the value of the second parameter β is shown. This regards situations when the ego-agent 4 is alone, because the value of the second parameter β influences the target velocity. Similarly, the value of the third parameter γ regards the acceleration. These relations between the values of the three parameters α, β, γ are exploited in order to estimate a personalized parameter value. For the following explanations it will only be referred to the first parameter α for keeping the explanations concise.

Figure 4:
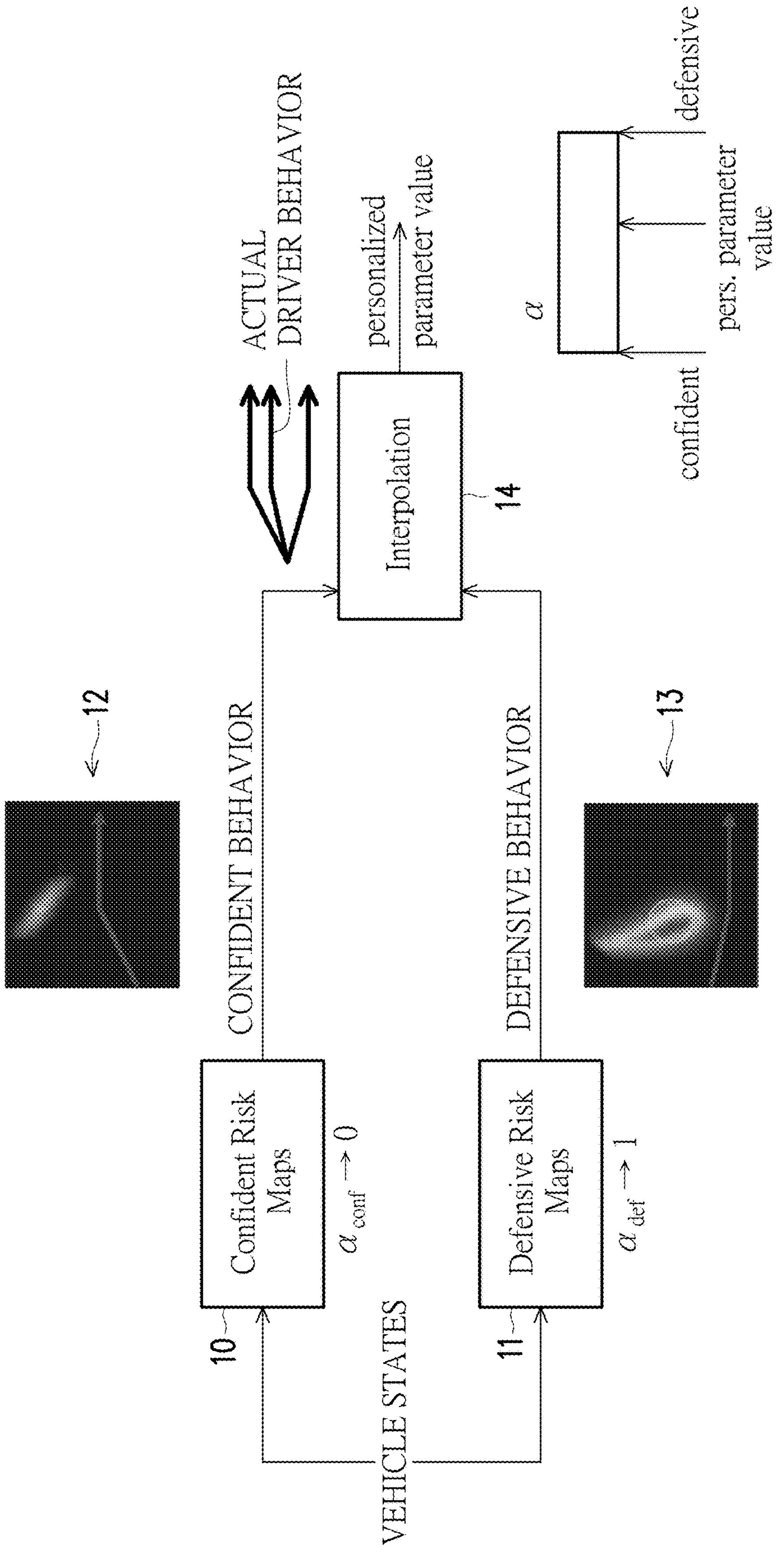
FIG. 4 shows a block diagram of the process of estimating a personalized parameter value.

FIG. 4 illustrates the procedure to estimate a value for the personalized first parameter. First, based on an actual vehicle state, two risk maps are created. A first risk map 10 is created using a first value for the first parameter α, and a second risk map 11 is created using a second value for the first parameter α. It is preferred that the parameter values used correspond to the lower limit (e.g., α=0, beginner driver) and the upper limit (e.g., α=1, confident driver) of an interval for the values of the first parameter α. For both created risk maps 10, 11, behavior planning is performed resulting in two different planned behaviors 12, 13, denoted in FIG. 4 as "confident behavior" and "defensive behavior".

Then, based on the two planned behaviors 12, 13 and the actual behavior of the ego-agent, interpolation 14 is performed using current vehicle states, which are also used for the determination of the planned behaviors 12, 13, in order to derive from the vehicle states the current behavior of the ego-agent 4 corresponding to the actual control performed by the operator, and, as a result the actual parameter value. It is to be noted that the actual parameter value is the same as the personalized parameter value in case that no further processing of the estimated value is made. This interpolation may be made, for example, by comparing acceleration values of the planned behaviors and the actual behavior.

In the lower right of FIG. 4, the interval of values that the first parameter α may take and the resulting personalized parameter value for the operator (driver) relative to the planned behaviors resulting from the planning algorithm using the lower limit and the upper limit as parameter values is illustrated.

Figure 5:
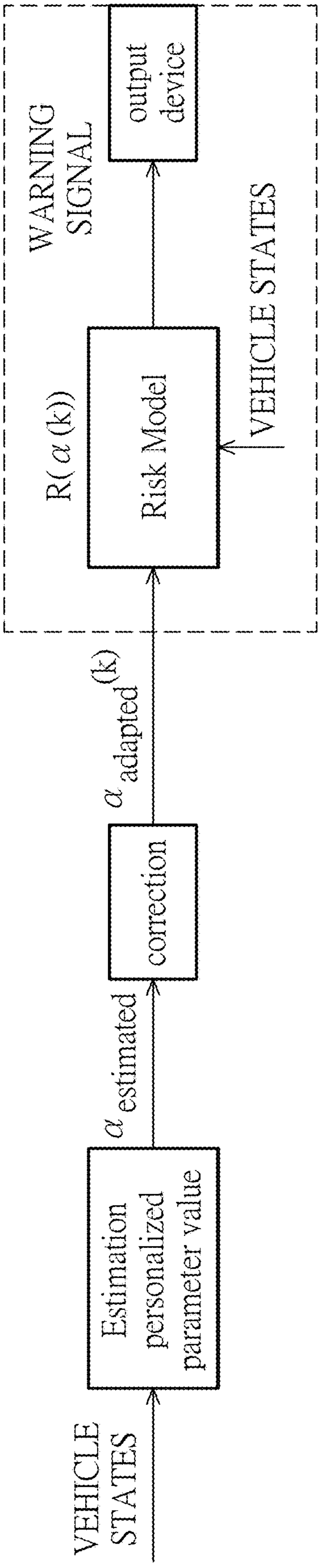
FIG. 5 shows the process of creating an output communicating a risk based on an adapted parameter value.

Once the personalized parameter value is estimated, a correction is performed in order to generate an adapted parameter value used to estimate the risk by generating a risk map using the adaptive parameter value. This process is illustrated in FIG. 5. After the personalized parameter value is determined in 15, the parameter correction value is determined and applied to the personalized parameter value in 16. The estimation in 15 may also comprise the processing of actual parameter values to determine the personalized parameter value as explained above. By correcting the personalized parameter value, an adapted parameter value is generated. This adapted parameter value, indicated by α(k) in the drawing, is input into the risk model. The risk model, based on the adapted parameter value and the vehicle states, generates the warning signal to be communicated to the operator. This communication may be a continuous output to the operator providing warnings over a human machine interface or by semi-autonomously adjusting the control input from the operator. The calculation of a risk map and the determination of a risk to be communicated to the operator do not differ from prior art approaches. However, according to the invention, the parameter values for application of the risk model or generation of the risk map are not only adapted to the operator's style but further corrected to achieve the educational effect. For communicating, the system comprises a display on which warning or risk measures can be displayed. Alternatively, the communication can use a loudspeaker or audio signal supplied to headphones or a similar device for communication.

Figure 6:
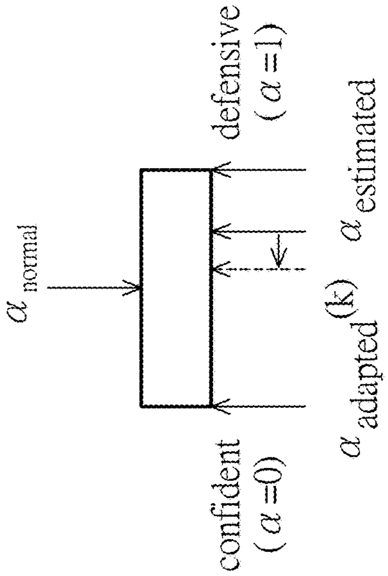
FIG. 6 shows the effect of a correction value.

In FIG. 6, in addition to the first value of the first parameter and the second value of the first parameter, the personalized parameter value and its shift by the correction value is illustrated. The figure also shows a "normal value" for the first parameter, which is the target value that might be chosen to correspond to an average skilled operator. This "normal value" constitutes the target value in the explained embodiment. However, it is not necessary that this value is the average of the entirety of operators. The value can be set in order to guide all operators towards safer operation of their ego-agents.

The adapted parameter value is calculated as:

$$\alpha_{adapted}(k)=\alpha_{estimated}+(\alpha_{normal}-\alpha_{estimated})*k$$

k is a correction coefficient allowing to adjust how strong the correction is for a given difference between the personalized parameter value $\alpha_{estimated}$ and the target value $\alpha_{normal}$. Basis for the calculation of the adapted parameter value $\alpha_{adaoted}(k)$ is the deviation of the estimated parameter value $\alpha_{estimated}$ from the normal parameter value $\alpha_{normal}$, and k can be freely set in an interval, for example between 0 and 1, according to the desired effect. A correction value of k=0.1, for example, may slowly guide the driver to the average safe driving style.

In order to adjust the intensity of the effect, the correction coefficient may be adjusted. For example, if it is recognized that the driver has a low awareness, is sleepy and/or stressed, it may be desirable to provide a smaller correction value. Since the difference between the estimated parameter value $\alpha_{estimated}$ and the normal parameter value $\alpha_{normal}$ is still the same, the correction coefficient k is then adjusted towards 0. On the other hand, in case that the operator's awareness is high, the operator is not sleepy or stressed, a stronger correction might be desired. By adjusting the coefficient to be higher (k→1), this effect can be achieved.

Another way of adapting the correction coefficient k is to take into consideration the amount of the deviation of the estimated parameter value $\alpha_{estimated}$ from the normal parameter value $\alpha_{normal}$. For example, the correction coefficient k can be increased for smaller differences and decreased for large differences. The reduction of the correction coefficient k for large differences avoids that the driver is overstrained. On the other hand, the increase of the correction coefficient k for small differences ensures that the adaptation of the parameter value still has an effect. Otherwise, it would be neglectable the closer the operator's style is to the normal style. A table associating the correction values with the calculated differences can be stored in a memory and retrieved by the processor executing all the calculations and determinations explained above in order to estimate the risk.

It is to be noted that the explanations given so far do not distinguish between the personalized parameter value and an actual parameter value for the current behavior of the ego-agent. This means that the actual parameter value that is estimated as explained above, for example by an interpolation, is directly used as personalized parameter value for further processing and estimating a risk to be communicated to the operator. However, it might be preferred to estimate a plurality of actual parameter values and, based thereon, determine a personalized parameter value. This avoids that fluctuations of the actual parameter value directly affect the estimation of the risk.

What is claimed is:

1. A method for assisting an operator of an ego-agent by communicating a risk in a future situation to the operator, the method comprising the steps of:

applying, by a processor, a behavior planning algorithm using at least a first value for a parameter and a second value for the parameter in a cost function of the behavior planning algorithm to determine at least a first and a second planned behavior of the ego-agent;

determining, by the processor, a current state of the ego-agent to determine an actual behavior of the ego-agent;

estimating, by the processor, a personalized parameter value for the parameter in the cost function based on a relation of at least the first and second planned behavior and the actual behavior of the ego-agent;

determining, by the processor, a parameter correction value at least based on the personalized parameter value and a target parameter value for the parameter in the cost function, wherein the parameter correction value shifts the personalized parameter value towards the target parameter value;

generating, by the processor, an adapted parameter value for the parameter in the cost function by correcting the personalized parameter value using the parameter correction value;

applying, by the processor, the behavior planning algorithm based on the adapted parameter value and estimating a future risk using the adapted parameter value in the behavior planning algorithm; and communicating, by the processor, the estimated future risk to the operator via a human machine interface or adjusting semi-autonomously a control input from the operator via the human machine interface.

2. The method according to claim 1, wherein the estimation of the personalized parameter value includes interpolating the actual behavior of the ego-agent with the at least first and second planned behavior of the ego-agent.

3. The method according to claim 1, wherein the estimation of the personalized parameter value of the cost function includes comparing the acceleration of the actual behavior of the ego-agent with an acceleration according to at least the first and second planned behavior of the ego-agent.

4. The method according to claim 1, wherein the parameter correction value is calculated based on a difference between the target parameter value and the personalized parameter value, and a correction coefficient.

5. The method according to claim 1, wherein the parameter correction value is calculated based on difference between the target parameter value and the personalized parameter value, and a correction coefficient, wherein a value of the correction coefficient is determined based at least on one of: difference between the personalized and the target parameter value, and an operator condition.

6. The method according to claim 1, wherein the estimation of the personalized parameter value is repeatedly executed during operation of the ego-agent.

7. The method according to claim 1, wherein the personalized parameter value is estimated based on a plurality of actual parameter values estimated based on the relation of at least the first and second planned behavior of the ego-agent and the actual behavior of the ego-agent.

8. The method according to claim 1, wherein the last personalized parameter value estimated during a previous operation of the ego-agent is used as the personalized parameter value for the risk estimation of a current operation.

9. The method according to claim 1, wherein the last personalized parameter value estimated during a previous operation of the ego-agent is updated with the personalized parameter value estimated during the current operation of the ego-agent and the updated personalized parameter is used as the personalized parameter value for the risk estimation of the current operation.

10. The method according to claim 1, wherein actual parameter values are estimated repeatedly based on the relation of at least the first and second planned behavior and the actual behavior of the ego-agent and a confidence measure is calculated for a latest actual parameter value, which is taken over as the personalized parameter value when its confidence measure exceeds a confidence threshold.

11. The method according to claim 1, wherein the values of the parameter are in an interval and a lower limit of the interval is used as the first value of the parameter and the upper limit of the interval is used as the second value of the parameter.

12. The method according to claim 1, wherein the cost function comprises, in addition to a risk component, at least one of: a utility component and a comfort component, and each component is weighted with a dedicated parameter.

13. The method according to claim 1, wherein the cost function comprises, in addition to a risk component, at least one of: a utility component and a comfort component, each component is weighted with a dedicated parameter, and the method according to claim 1 is executed in respect of the risk component, and, in addition, in respect of at least one of the utility component and the comfort component.

14. The method according to claim 1, wherein a development of the correction value over time is evaluated and a feedback on the evaluation result is provided to the operator.

15. A program comprising program-code means for executing a method for assisting an operator of an ego-agent, when the program is executed on a computer or digital signal processor, wherein the method comprises:

applying a behavior planning algorithm using at least a first value of a parameter value and a second value of the parameter in a cost function of the behavior planning algorithm to determine at least a first and a second planned behavior of the ego-agent;

determining a current state of the ego-agent to determine an actual behavior of the ego-agent;

estimating a personalized parameter value for the parameter in the cost function based on a relation of the at least first and second planned behavior and an actual behavior of the ego-agent;

determining a parameter correction value at least based on the personalized parameter value and a target parameter value for the parameter in the cost function, wherein the parameter correction value shifts the personalized parameter value towards the target parameter value;

generating an adapted parameter value for the parameter in the cost function by correcting the personalized parameter value using the parameter correction value;

applying the behavior planning algorithm based on the adapted parameter value and estimating a future risk using the adapted parameter value in the behavior planning algorithm; and generating an output signal for communicating the estimated future risk to the operator via a human machine interface or adjusting semi-autonomously a control input from the operator via the human machine interface.

16. A non-transitory computer-readable storage medium embodying a program of machine-readable instructions executable by a digital processing apparatus, which cause the digital processing apparatus to perform:

applying a behavior planning algorithm using at least a first value of a parameter and a second value of the parameter in a cost function of the behavior planning algorithm to determine at least a first and a second planned behavior of the ego-agent;

determining a current state of the ego-agent to determine an actual behavior of the ego-agent;

estimating a personalized parameter value for the parameter in the cost function based on a relation of the at least first and second planned behavior and an actual behavior of the ego-agent;

determining a parameter correction value at least based on the personalized parameter value and a target parameter value for the parameter in the cost function, wherein the parameter correction value shifts the personalized parameter value towards the target parameter value;

generate an adapted parameter value for the parameter in the cost function by correcting the personalized parameter value using the parameter correction value;

applying the behavior planning algorithm based on the adapted parameter value and estimating a future risk using the adapted parameter value in the behavior planning algorithm; and generating an output signal for communicating the estimated future risk to the operator via a human machine interface or adjusting semi-autonomously a control input from the operator via the human machine interface.

17. An assistance system for assisting an ego-agent, the system comprises a processor configured to apply a behavior planning algorithm using at least a first value of a parameter and a second value of the parameter in a cost function of the behavior planning algorithm to determine at least a first and a second planned behavior of the ego-agent;

determine a current state of the ego-agent to determine an actual behavior of the ego-agent;

estimate a personalized parameter value for the parameter in the cost function based on a relation of the at least first and second planned behavior and an actual behavior of the ego-agent;

determine a parameter correction value at least based on the personalized parameter value and a target parameter value for the parameter in the cost function, wherein the parameter correction value shifts the personalized parameter value towards the target parameter value;

generate an adapted parameter value for the parameter in the cost function by correcting the personalized parameter value using the parameter correction value;

apply the behavior planning algorithm based on the adapted parameter value and estimate a future risk using the adapted parameter value in the behavior planning algorithm; and communicate the estimated future risk to the operator via a human machine interface or adjusting semi-autonomously a control input from the operator via the human machine interface.

* * * * *